United States Patent
Han et al.

(10) Patent No.: US 10,393,992 B1
(45) Date of Patent: Aug. 27, 2019

(54) AUTO FOCUS BASED AUTO WHITE BALANCE

(71) Applicant: QUALCOMM Incorporated, San Diego, CA (US)

(72) Inventors: Kyuseo Han, San Diego, CA (US); Jisoo Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/986,507

(22) Filed: May 22, 2018

(51) Int. Cl.
- *G02B 7/09* (2006.01)
- *H04N 9/73* (2006.01)
- *H04N 5/232* (2006.01)
- *G06F 3/0484* (2013.01)

(52) U.S. Cl.
CPC .......... *G02B 7/09* (2013.01); *G06F 3/04845* (2013.01); *H04N 5/23212* (2013.01); *H04N 5/23248* (2013.01); *H04N 9/735* (2013.01)

(58) Field of Classification Search
CPC .. G02B 7/09; G06F 3/04845; H04N 5/23212; H04N 5/23248; H04N 9/73; H04N 9/3182; H04N 9/735; H04N 9/71; H04N 1/6077; H04N 13/133

USPC .......................................... 348/223.1–229.1
See application file for complete search history.

(56) References Cited

U.S. PATENT DOCUMENTS

| | | | |
|---|---|---|---|
| 2008/0101710 A1* | 5/2008 | Hatano | G06K 9/00261 382/238 |
| 2018/0359410 A1* | 12/2018 | Ain-Kedem | H04N 5/3532 |
| 2019/0068938 A1* | 2/2019 | Asano | H04N 1/6077 |

* cited by examiner

*Primary Examiner* — Yogesh K Aggarwal
(74) *Attorney, Agent, or Firm* — Pamela K. Soggu

(57) ABSTRACT

Methods, devices, and systems for automatic white balance are disclosed. In some aspects, a device includes a memory and a processor coupled to a camera and the memory. The processor may be configured to determine a first number of statistics associated with a first frame, cause the camera to perform a first autofocus operation, determine a second number of statistics associated with a second frame during the first autofocus operation, the second number of statistics being less than the first number of statistics, determine a white balance gain based on the first number of statistics and the second number of statistics, and apply the white balance gain to a third frame.

30 Claims, 8 Drawing Sheets

AUTO FOCUS BASED AUTO WHITE BALANCE

TECHNICAL FIELD

This disclosure generally relates to automatic white balance, and more particularly, to techniques for automatic white balance to consumer less power.

BACKGROUND

The lighting of a scene may affect the colors of an image. For example, fluorescent lighting may cause a blue or cool cast in an image, and incandescent lighting may cause a yellow or warm cast in an image. As a result, an image may include tinting such that image colors may be skewed toward a specific color. For example, blue tinting may include colors skewing towards a blue color.

A device may use automatic white balancing to compensate for lighting temperature effects (such as tinting) in a captured image. A white balance setting may attempt to determine a difference between an observed white color and an estimated white color for a portion of an image to adjust all color values in the image. For example, a device may determine a white balance setting that is used to remove a tinting (such as a blue, red, or green tint) from neutral colors (such as grays and whites) in an image, and the white balance setting may be applied to the entire image.

Automatic white balancing is a power consuming process, particularly determining a white balance setting for each image received at the device during preview mode.

SUMMARY OF THE INVENTION

Aspects of the present disclosure are directed to methods and devices for automatic white balance. In one aspect a device includes a memory and a processor coupled to a camera and the memory. The processor may be configured to determine a first number of statistics associated with a first frame. The processor may also be configured to cause the camera to perform a first autofocus operation. The processor may also be configured to determine a second number of statistics associated with a second frame during the first autofocus operation. The second number of statistics may be less than the first number of statistics. The processor may also be configured to determine a white balance gain for the second frame based on the first number of statistics and the second number of statistics. The processor may also be configured to apply the white balance gain to a third frame.

In some aspects, the processor may also be configured to determine a first white balance gain associated with the first number of statistics and determine a second white balance gain associated with the second number of statistics. The first white balance gain may be applied to the second frame.

In some aspects, determining the white balance gain may include interpolating the first white balance gain associated with the first number of statistics and the second white balance gain associated with the second number of statistics.

The processor may be further configured to output the third frame with the applied white balance gain for display.

The first autofocus operation may include a course search autofocus operation.

The device may include the camera. In some aspects, the device may also include a display.

In some aspects, the processor may be configured to receive a third frame. The processor may also be configured to determine a third number of statistics associated with the third frame during the first autofocus operation. The third number of statistics may be less than the first number of statistics. The processor may also be configured to determine a third white balance gain based on the first number of statistics and the third number of statistics. The processor may also be configured to apply the third white balance gain to a fourth frame.

In some aspects, the processor may be configured to receive a third frame. The processor may also be configured to cause the camera to perform a second autofocus operation. The processor may also be configured to determine a third number of statistics associated with the third frame during the second autofocus operation. The processor may also be configured determine a third white balance gain for the third frame based on the third number of statistics. The processor may also be configured to apply the third white balance gain to a fourth frame.

In some aspects, the first autofocus operation may include a course search autofocus operation and the second autofocus operation may include a fine search autofocus operation.

In another aspect, a method is disclosed. The method may include determining a first number of statistics associated with a first frame. The method may further include performing a first autofocus operation. The method may also include determining a second number of statistics associated with a second frame during the first autofocus operation. The second number of statistics may be less than the first number of statistics. The method may further include determining a white balance gain based on the first number of statistics and the second number of statistics. The method may also include applying the white balance gain to a third frame.

In some aspects, the method may also include determining a first white balance gain associated with the first number of statistics and determining a second white balance gain associated with the second number of statistics. The first white balance gain may be applied to the second frame.

In some aspects, determining the white balance gain may include interpolating the first white balance gain associated with the first number of statistics and the second white balance gain associated with the second number of statistics.

The method may further include outputting the third frame with the applied white balance gain for display. The third frame output for display may be displayed via a display.

The first autofocus operation may include a course search autofocus operation.

In some aspects, the method may further include receiving a third frame. The method may also include determining a third number of statistics associated with the third frame during the first autofocus operation. The third number of statistics may be less than the first number of statistics. The method may also include determining a third white balance gain based on the first number of statistics and the third number of statistics. The method may also include applying the third white balance gain to a fourth frame.

In some aspects, the method may further include receiving a third frame. The method may also include performing a second autofocus operation. The method may also include determining a third number of statistics associated with the third frame during the second autofocus operation. The method may also include determining a third white balance gain based on the third number of statistics. The method may also include applying the third white balance gain to a fourth frame.

In some aspects, the first autofocus operation may include a course search autofocus operation and the second autofocus operation may include a fine search autofocus operation.

In yet another aspect, a non-transitory computer-readable storage medium is disclosed. The non-transitory computer-readable storage medium may store instructions thereon that, when executed, cause one or more processors to determine a first number of statistics associated with a first frame, perform a first autofocus operation, determine a second number of statistics associated with a second frame during the first autofocus operation, the second number of statistics being less than the first number of statistics, determine a white balance gain based on the first number of statistics and the second number of statistics, and apply the white balance gain to a third frame.

In a further aspect, a device is disclosed. The device may include means for determining a first number of statistics associated with a first frame. The device may also include means for causing a camera to perform a first autofocus operation. The device may also include means for determining a second number of statistics associated with a second frame during the first autofocus operation. The second number of statistics may be less than the first number of statistics. The device may also include means for determining a white balance gain based on the first number of statistics and the second number of statistics. The device may further include means for applying the white balance gain to a third frame.

The details of one or more examples are set forth in the accompanying drawings and the description below. Other features, objects, and advantages will be apparent from the description, drawings, and claims.

DETAILED DESCRIPTION

Figure 1A:
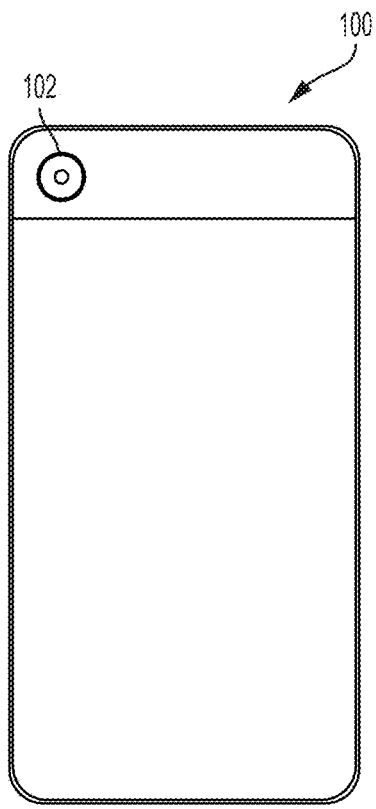
FIGS. 1A-1B depict examples of devices including a camera.

Aspects of this disclosure, as will be described in further detail below, may include determining a first number of statistics associated with a first frame (e.g., received image data), performing an autofocus operation, and determining a second number of statistics associated with a second frame during the autofocus operation. The second number of statistics may be less than the first number of statistics. A white balance gain may be determined based on the first number of statistics and the second number of statistics. The white balance gain may be applied to a third frame.

White balance processing may involve application of white balance gains and/or scaling to respective colormetric channels of an image (e.g., RGB, XYZ, or YUV color channels). The gains may be defined for an illuminant (e.g., a lighting condition, a type of light, etc.). White balance is a process used to try to match colors of an image with a user's perceptual experience of the object being captured. As an example, the white balance process may be designed to make white objects actually appear white in the processed image and gray objects actually appear gray in the processed image.

In some examples, a user of an image capture device may select or indicate an illuminant under which an image was captured. In other examples, the image capture device itself may automatically determine the most likely illuminant and perform white balancing based on the determined illuminant (e.g., lighting condition). Such a process may be referred to as automatic white balance (AWB). In order to better render the colors of a scene, an AWB algorithm on a device and/or camera may attempt to determine the illuminants of the scene and set/adjust the white balance of an image accordingly.

An image capturing device, during the AWB process, may determine or estimate a color temperature for an image. The color temperature may indicate a dominant color tone for the image. The true color temperature for a scene of which is being captured in a video or image is the color of the light sources for the scene. If the light is radiation emitted from a perfect blackbody radiator (theoretically ideal for all electromagnetic wavelengths) at a particular color temperature (represented in Kelvin (K)), and the color temperatures are known, then the color temperature for the scene is known. For example, in a Commission Internationale de l'éclairage (CIE) defined color space (from 1931), the chromaticity of radiation from a blackbody radiator with temperatures from 1,000 to 20,000 K is the Planckian locus. Colors on the Planckian locus from approximately 2,000 K to 20,000 K are considered white, with 2,000 K being a warm or reddish white and 20,000 K being a cool or bluish white. Many incandescent light sources include a Planckian radiator (tungsten wire or another filament to glow) that emits a warm white light with a color temperature of approximately 2,400 to 3,100 K.

However, other light sources, such as fluorescent lights, discharge lamps, or light emitting diodes (LEDs), are not perfect blackbody radiators whose radiation falls along the Planckian locus. For example, an LED or a neon sign emit light through electroluminescence, and the color of the light does not follow the Planckian locus. The color temperature determined for such light sources may be a correlated color temperature (CCT). The CCT is the estimated color temperature for light sources whose colors do not fall exactly on the Planckian locus. For example, the CCT of a light source is the blackbody color temperature that is closest to the radiation of the light source. CCT may also be denoted in K.

CCT may be an approximation of the true color temperature for the scene. For example, the CCT may be a simplified color metric of chromaticity coordinates in the CIE 1931 color space. Many devices may use AWB to estimate a CCT for color balancing.

The CCT may be a temperature rating from warm colors (such as yellows and reds below 3200 K) to cool colors (such as blue above 4000 K). The CCT (or other color temperature) may indicate the tinting that will appear in an image captured using such light sources. For example, a CCT of 2700 K may indicate a red tinting, and a CCT of 5000 K may indicate a blue tinting.

Different lighting sources or ambient lighting may illuminate a scene, and the color temperatures are unknown to the device. As a result, the device may analyze data captured by the camera sensor to estimate a color temperature for an image (e.g., a frame). For example, the color temperature may be an estimation of the overall CCT of the light sources for the scene in the image. The data captured by the camera sensor used to estimate the color temperature for a frame (e.g., image) may be the captured image itself.

After the device determines a color temperature for the scene (such as during performance of AWB), the device may use the color temperature to determine a color balance for correcting any tinting in the image. For example, if the color temperature indicates that an image includes a red tinting, a device may decrease the red value or increase the blue value for each pixel of the image, e.g., in an RGB space. The color balance may be the color correction (such as the values to reduce the red values or increase the blue values).

The AWB process is a power consuming process, particularly during autofocus operations when an image and/or object to be captured is blurry in the received image or frame. For example, the AWB process may run for each frame. Even when an image capture device is in preview mode (e.g., the device is receiving image data for a field of view, but may not be capturing it in permanent memory), the AWB process may be running in order to display an image preview via a display associated with the image capture device. The AWB process may be applied to each frame being displayed for preview. For example, if 30 or 60 frames are being received per second, the AWB process is determining and applying AWB gains to each frame (e.g., 30 or 60 frames per second).

While the user is in preview mode, the image capture device may perform an automatic focus operation. If an object and/or region of interest within the field of view of the image capture device is out of focus, the field if view may still be displayed via the display associated with the image capture device. For example, even if the image (e.g., field of view) being displayed is blurred due to the image being out of focus or due to the user moving the image capture device, the AWB process may still run on the out of focus images in order to determine and/or apply white balance gains to the preview images, thus consuming a lot of power because the user is likely not capturing (e.g., in permanent memory) the blurred or out of focus images.

This disclosure describes techniques for decreasing power consumption associated with the AWB process. In general, as part of performing an AWB process, a determination may be made as to whether a received image is stable (e.g., whether the received image is in focus or how close the received image is to being in focus based on camera lens movements). Based on the image being unstable, the AWB process may run in a low power mode, as will be discussed in further detail below.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

All of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "causing," "acces sing," "receiving," "sending," "using," "selecting," "determining," "normalizing," "multiplying," "averaging," "monitoring," "comparing," "applying," "updating," "measuring," "deriving," "estimating" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, equivalents thereof, and the like. Aspects of the present disclosure are applicable to any suitable device (such as smartphones, tablets, laptop computers, digital cameras, web cameras, a security system, automobiles, drones, aircraft, and so on) having or coupled to one or more cameras. For multiple cameras, the cameras may include a primary camera and one or more auxiliary cameras with similar capabilities as the primary camera. For example, a device may include a dual camera module with two cameras. The camera(s) may be able to capture and process still images or video. While described below with respect to capturing and processing images, aspects of the present disclosure are applicable to capturing and processing video, and are therefore not limited to still images.

Figure 1B:
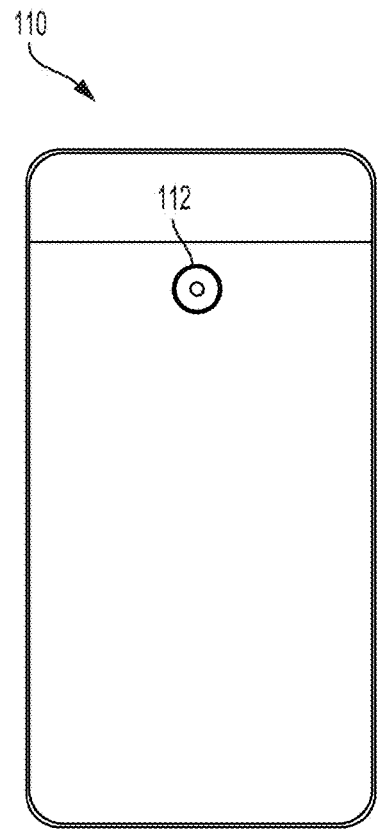
Figure 2A:
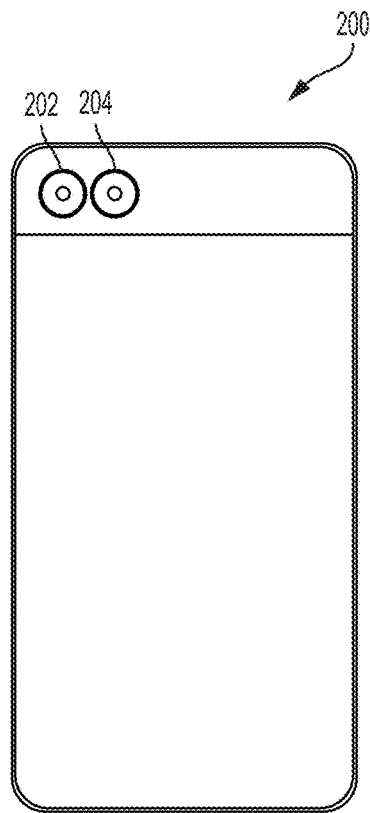
FIGS. 2A-2B depict examples of devices including multiple cameras.
Figure 2B:
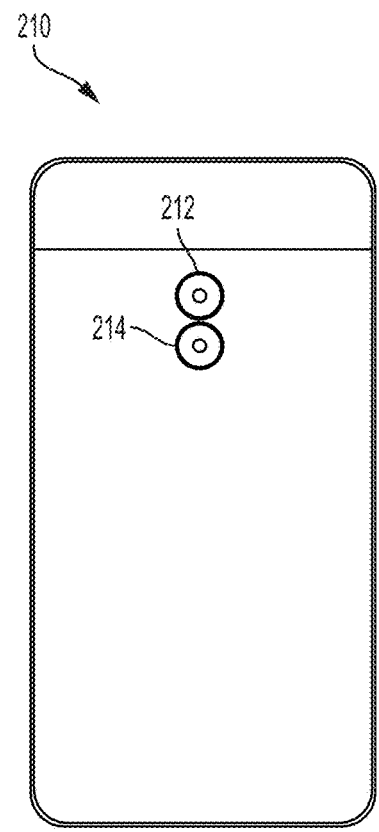

FIG. 1A depicts an example device 100 including a camera 102 arranged in a first configuration, and FIG. 1B depicts an example device 110 including a camera 112 arranged in a second configuration. FIG. 2A depicts an example device 200 including a dual camera with a first camera 202 and a second camera 204 arranged in a first configuration, and FIG. 2B depicts an example device 210 including a dual camera with a first camera 212 and a second camera 214 arranged in a second configuration. In some aspects, one of the cameras (such as the first cameras 202 and 212 of respective devices 200 and 210) may be a primary camera, and the other of the cameras (such as the second cameras 204 and 214 respective devices 200 and 210) may be an auxiliary camera. The second cameras 204 and 214 may have the same characteristics and capabilities (such as the same focal length, same capture rate, same resolution, same color palette, and the same field of view or capture) as the first cameras 202 and 212, respectively. Alternatively, the second cameras 204 and 214 may have different characteristics and abilities than the first cameras 202 and 212, respectively. Although the first cameras 202, 212 and second cameras 204, 214 are depicted in FIGS. 2A and 2B as being disposed on a common side of example devices 200 and 210, it will be understood that in some implementations a first camera can be disposed so as to face a different direction than a second camera. Thus, techniques and aspects disclosed herein can be implemented using a front facing camera and a rear facing camera. Similarly, the techniques and aspects disclosed herein can be applied in devices having other camera configurations, for example, 360 degree capture devices having at least one camera with a field-of-view that at least partially overlaps or at least abuts a field-of-view of a second camera. Any configuration of cameras may be used, and the disclosure should not be limited to the illustrated examples in FIGS. 1A, 1B, 2A, and 2B.

The term "device" is not limited to one or a specific number of physical objects (such as one smartphone). As used herein, a device may be any electronic device with multiple parts that may implement at least some portions of this disclosure. In one example, a device may be a video security system including one or more hubs and one or more separate cameras. In another example, a device may be a computer. In another example, a device may be a smartphone including two cameras such as, for example, the example devices 200 and 210 of FIGS. 2A and 2B, respectively. While the below description and examples use the term "device" to describe various aspects of this disclosure, the term "device" is not limited to a specific configuration, type, or number of objects.

Figure 3:
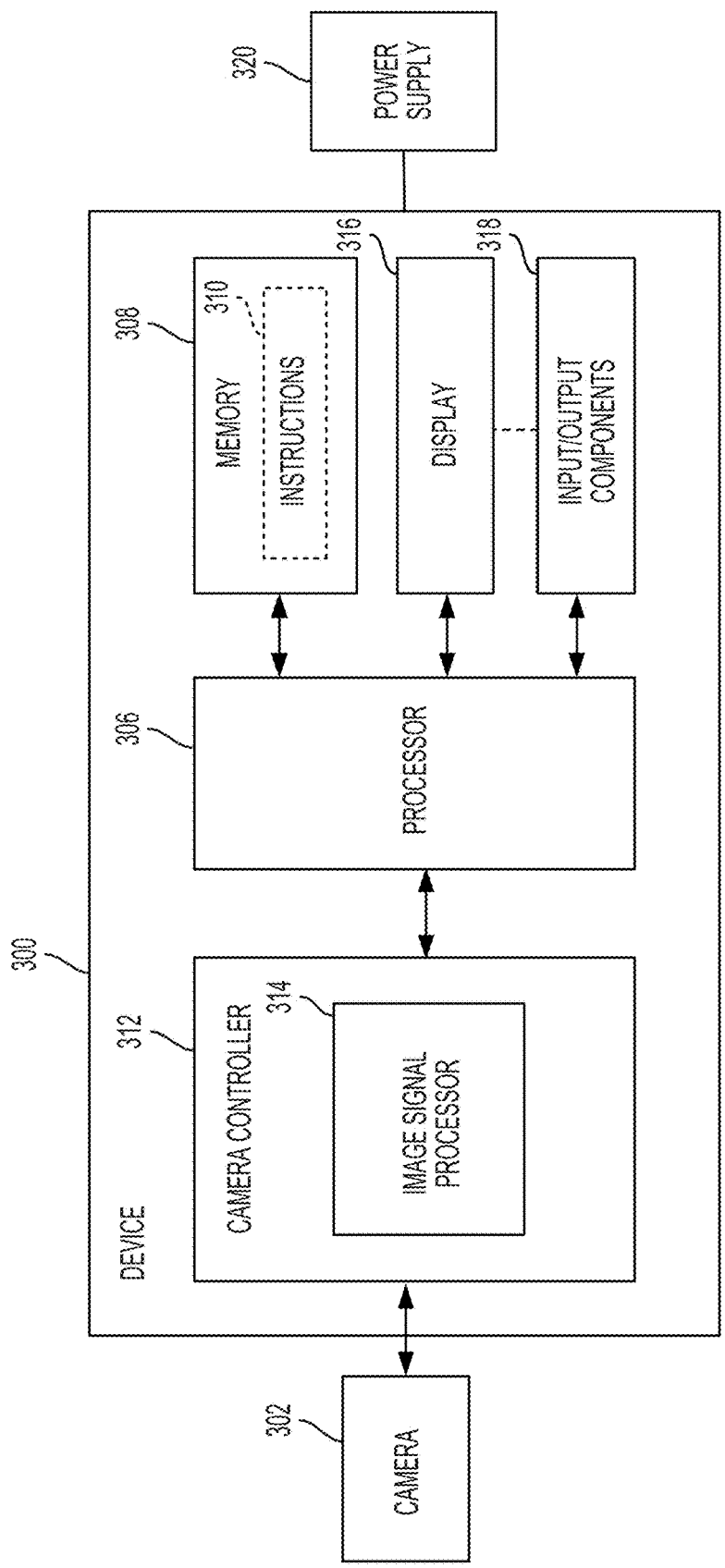
FIG. 3 is a block diagram of an example device.

FIG. 3 is a block diagram of an example device 300 that may be used to enable a low power mode for AWB. Device 300 may include or may be coupled to a camera 302, and may further include a processor 306, a memory 308 storing instructions 310, a camera controller 312, a display 316, and a number of input/output (I/O) components 318. The example device 300 may be any suitable device capable of capturing and/or storing images or video including, for example, wired and wireless communication devices (such as camera phones, smartphones, tablets, security systems, dash cameras, laptop computers, desktop computers, automobiles, drones, aircraft, and so on), digital cameras (including still cameras, video cameras, and so on), or any other suitable device. The device 300 may include additional features or components not shown. For example, a wireless interface, which may include a number of transceivers and a baseband processor, may be included for a wireless communication device. Device 300 may include or may be coupled to additional cameras other than the camera 302. The disclosure should not be limited to any specific examples or illustrations, including the example device 300.

Camera 302 may be capable of capturing individual image frames (such as still images) and/or capturing video (such as a succession of captured image frames). Camera 302 may include one or more image sensors (not shown for simplicity) and shutters for capturing an image frame and providing the captured image frame to camera controller 312. Although a single camera 302 is shown, any number of cameras or camera components may be included and/or coupled to device 300 (such as FIGS. 2A and 2B). For example, the number of cameras may be increased to achieve greater depth determining capabilities or better resolution for a given FOV.

Memory 308 may be a non-transient or non-transitory computer readable medium storing computer-executable instructions 310 to perform all or a portion of one or more operations described in this disclosure. Device 300 may also include a power supply 320, which may be coupled to or integrated into the device 300.

Processor 306 may be one or more suitable processors capable of executing scripts or instructions of one or more software programs (such as the instructions 310) stored within memory 308. In some aspects, processor 306 may be one or more general purpose processors that execute instructions 310 to cause device 300 to perform any number of functions or operations. In additional or alternative aspects, processor 306 may include integrated circuits or other hardware to perform functions or operations without the use of software. While shown to be coupled to each other via a processor 306 in the example of FIG. 3, processor 306, memory 308, camera controller 312, display 316, and I/O components 318 may be coupled to one another in various arrangements. For example, processor 306, memory 308, camera controller 312, display 316, and/or I/O components 318 may be coupled to each other via one or more local buses (not shown for simplicity).

Display 316 may be any suitable display or screen allowing for user interaction and/or to present items (such as captured images and/or videos) for viewing by the user. In some aspects, display 316 may be a touch-sensitive display. Display 316 may be part of or external to device 300. Display 316 may comprise an LCD, LED, OLED, or similar display. I/O components 318 may be or may include any suitable mechanism or interface to receive input (such as commands) from the user and to provide output to the user. For example, I/O components 318 may include (but are not limited to) a graphical user interface, keyboard, mouse, microphone and speakers, and so on.

Camera controller 312 may include an image signal processor 314, which may be (or may include) one or more image signal processors to process captured image frames or videos provided by camera 302. For example, image signal processor 314 may be configured to perform various processing operations for automatic focus (AF), automatic white balance (AWB), and/or automatic exposure (AE) that are described herein. Examples of image processing operations include, but are not limited to, cropping, scaling (e.g., to a different resolution), image stitching, image format conversion, color interpolation, image interpolation, color processing, image filtering (e.g., spatial image filtering), and/or the like.

In some example implementations, camera controller 312 (such as the image signal processor 314) may implement various functionality, including imaging processing and/or control operation of camera 402. In some aspects, image signal processor 314 may execute instructions from a memory (such as instructions 310 stored in memory 308 or instructions stored in a separate memory coupled to image signal processor 314) to control image processing and/or operation of camera 302. In other aspects, image signal processor 314 may include specific hardware to control image processing and/or operation of camera 302. Image signal processor 314 may alternatively or additionally include a combination of specific hardware and the ability to execute software instructions.

While not shown in FIG. 3, in some implementations, image signal processor 314 may include an AF module, an AWB module, and/or an AE module. Image signal processor 314 may be configured to execute an AF process, an AWB process, and/or an AE process. In some examples, image signal processor 314 may include hardware-specific circuits (e.g., an application-specific integrated circuit (ASIC)) configured to perform the AF, AWB, and/or AE processes. In other examples, image signal processor 314 may be configured to execute software and/or firmware to perform the AF, AWB, and/or AE processes. When configured in software, code for the AF, AWB, and/or AE processes may be stored in memory (such as instructions 310 stored in memory 308 or instructions stored in a separate memory coupled to image signal processor 314). In other examples, image signal processor 314 may perform the AF, AWB, and/or AE processes using a combination of hardware, firmware, and/or software. When configured as software, AF, AWB, and/or AE processes may include instructions that configure image signal processor 314 to perform various image processing and device managements tasks, including the AWB techniques of this disclosure.

Figure 4:
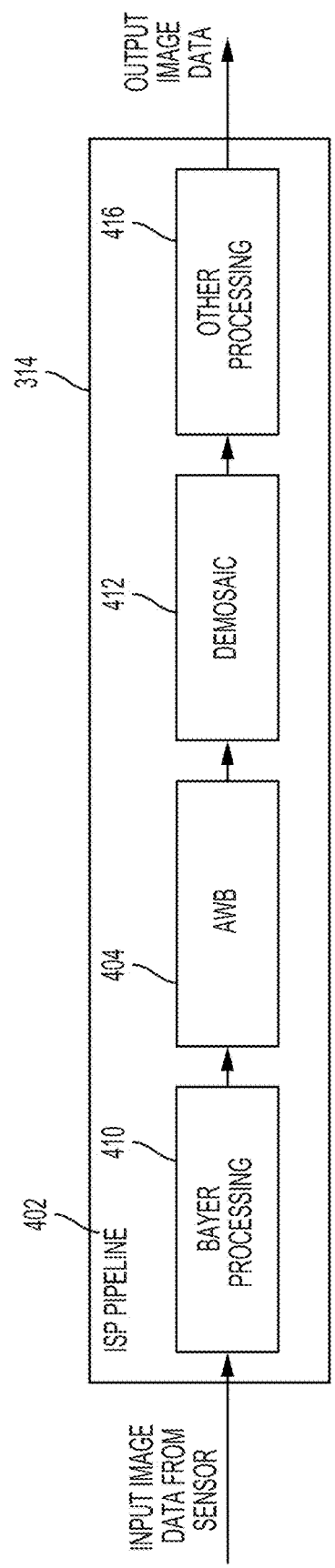
FIG. 4 is a block diagram showing the operation of an image signal processor pipeline.

FIG. 4 is a block diagram showing the operation of an image signal processor performing an automatic white balance process in more detail. Image signal processor 314 may be configured to execute an image signal processing (ISP) pipeline 402 to process image data input to ISP 312. The example of FIG. 4 is focused on AWB process 404. However, ISP pipeline 402 may also include an AEC process and AF process (not shown), which may be performed in parallel, or serially, with AWB process 404.

In the example of FIG. 4, ISP 314 may receive input image data from camera 302 of FIG. 3. In some examples, such as shown in FIG. 4, the input image data may include color data of the image and/or any other data (e.g., depth data). In the example of FIG. 4, the color data received for the input image may be in a Bayer format. Rather than capturing red (R), green (G), and blue (B) values for each pixel of an image, image sensors (e.g., an image sensor associated with camera 302 of FIG. 3) may use a Bayer filter mosaic (or more generally, a color filter array (CFA)), where each photosensor of a digital image sensor captures a different one of the RGB colors. Typical filter patterns for a Bayer filter mosaic may include 50% green filters, 25% red filters, and 25% blue filters, but this is for exemplary purposes only and is not meant to be a limitation of this disclosure.

Bayer processing unit 410 may perform one or more initial processing techniques on the raw Bayer data received by ISP 314, including, for example, subtraction, rolloff correction, bad pixel correction, black level compensation, and/or denoising.

AWB process 404 may analyze information relating to the received image data to determine an illuminant, from among a plurality of possible illuminants, and may determine an AWB gain to apply to the received image and/or a subsequent image. Example inputs to AWB process 404 may include Bayer grade (BG) statistics of the received image data, an exposure index (e.g., the brightness of the scene of the received image data), and auxiliary information, which may include depth information.

Demosaic processing unit 412 may be configured to convert the processed Bayer image data into RGB values for each pixel of an image. As explained above, Bayer data may only include values for one color channel (R, G, or B) for each pixel of the image. Demosaic processing unit 412 may determine values for the other color channels of a pixel by interpolating from color channel values of nearby pixels. In some ISP pipelines 402, demosaic processing unit 412 may come before AWB process 404 or after AWB process 404.

Other processing unit 416 may apply additional processing to the image after AWB process 404 and/or demosaic processing unit 412. The additional processing may include color, tone, and/or spatial processing of the image. For example, other processing unit 416 may apply a color balance process to the image.

Referring back to AWB process 404, in some example implementations, BG statistics may include a red color to green color ratio (R/G) (which may indicate whether a red tinting exists and the magnitude of the red tinting that may exist in an image) and/or a blue color to green color ratio (B/G) (which may indicate whether a blue tinting exists and the magnitude of the blue tinting that may exist in an image). For example, the (R/G) for a portion of an image (e.g., as described below, the image may be divided into one or more portions) may be depicted by equation (1) below:

$$R/G = \frac{\sum_{n=1}^{N} \text{Red}(n)}{\sum_{n=1}^{N} \text{Green}(n)} \quad (1)$$

where the portion includes pixels 1-N, each pixel n includes a red value Red(n), a blue value Blue(n), or a green value Green(n) in an RGB space. The (R/G) is the sum of the red values for the red pixels in the portion divided by the sum of the green values for the green pixels in the portion. Similarly, the (B/G) for the portion of the image may be depicted by equation (2) below:

$$B/G = \frac{\sum_{n=1}^{N} \text{Blue}(n)}{\sum_{n=1}^{N} \text{Green}(n)} \quad (2)$$

In some other example implementations, a different color space may be used, such as Y'UV, with chrominance values UV indicating the color, and/or other indications of a tinting or other color temperature effect for an image may be determined.

During AWB process 404, a device (e.g., device 300) may receive a frame or image. Device 300 may divide the frame into a plurality of portions. Device 300 may determine BG stats for each of the plurality of portions. For example, for each portion, device 300 may determine the (R/G) value and the (B/G) value, as described above, and use a distribution of the R/G values and B/G values for the portions to determine the white balance (and in turn, determine the color temperature) of the frame.

Figure 5B:
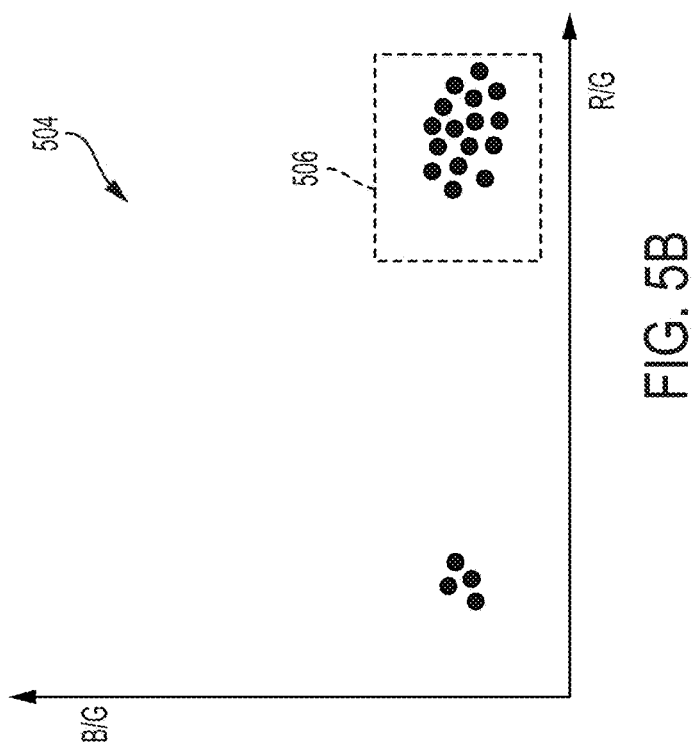
FIG. 5B depicts an exemplary graph used to determine white balance gain.
Figure 5A:
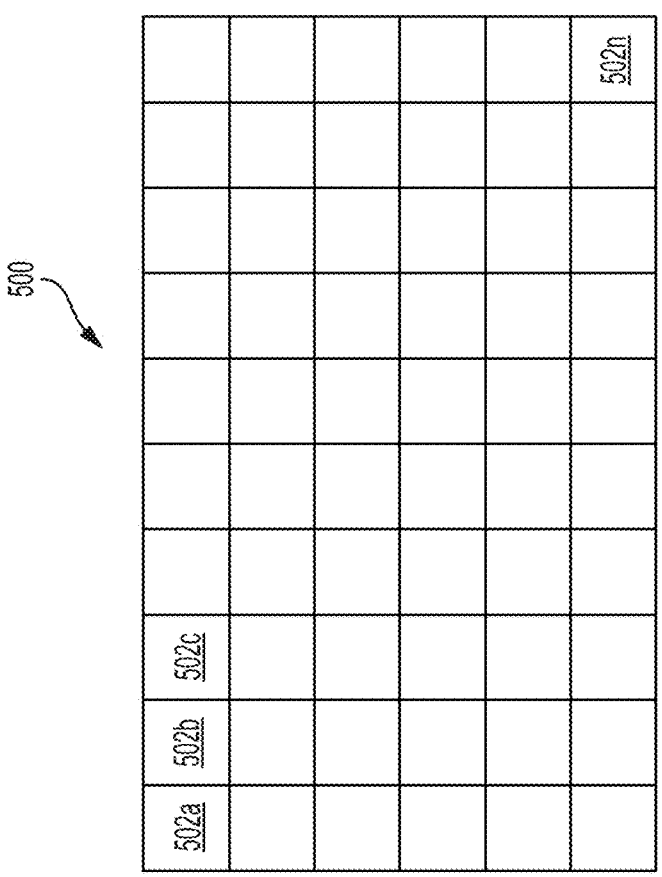
FIG. 5A depicts a frame divided into a plurality of portions.

Referring to FIG. 5A, frame (e.g., image) 500 is an exemplary depiction of a raw image. Frame 500 may be divided into portions 502a-n. The R/G and the B/G may be calculated for each portion. That is, for portion 502a, the R/G may be calculated as the sum of the red values for the red pixels in portion 502a divided by the sum of the green values for the green pixels in portion 502a. Similarly, the B/G may be calculated as the sum of the blue values for the blue pixels in portion 502a divided by the sum of the green values for the green pixels in portion 502a. The R/G and B/G may be calculated for each portion 502a-n.

Referring to FIG. 5B, graph 504 depicts an example distribution of the R/G versus the B/G for some portions 502a-502n of frame 500 of FIG. 5A. While any white balance algorithm may be used to determine white balance gains and/or color correction, one technique may include the "gray world assumption", which assumes that any scene is a neutral gray. That is, under the "gray world assumption", all the colors in a frame (e.g., image) should average out to a neutral gray. The distribution of BG stats (e.g., an example distribution is shown in FIG. 5B) may include different regions of the distribution (e.g., different regions in graph 504) they may be defined as "gray zones" for different illuminants. For example, the most likely illuminant of the image may be determined based on the illuminant for which the most BG stats fall within a defined region or zone. For example, graph 504 may include a gray zone (e.g., gray zone 506). Gray zone 506 may be used to estimate a white balance gain to apply to one or more frames. In one example, incandescent lighting (such as having a color temperature of 2400 K) may cause measurements (e.g., statistics) for portions of the image to be located in graph 504 farther away from the B/G axis. In another example, fluorescent lighting (such as having a color temperature of 4100 K) may cause measurements (e.g., statistics) for portions of the image to be located in graph 504 closer to the B/G axis. In this manner, if device 300 determines that a cluster of portions (such as having a number of points greater than a threshold within a range of R/G to B/G) is near a location for a type of lighting, device 300 may determine the color temperature for the image to be near or approximate to the color temperature for the lighting (e.g., incandescent lighting, fluorescent lighting, etc.) and may determine white balance gains to be applied to one or more frames accordingly. As discussed above, this is for exemplary purposes only and is not meant to be a limitation of this disclosure. As such, any white balance algorithm may be used.

AWB can consume a lot of power because a determination of the red to green pixel ratio and blue to green pixel ratio is calculated for each portion of each frame being received by the camera sensor (e.g., camera 302 of FIG. 3). For example, 3,072 pairs of BG stats (e.g., 3,072 R/G stats and 3,072 B/G stats) may be processed (and plotted in examples of the "gray world assumption") by device 300 in order to determine a white balance gain. The white balance gain may be applied to the current frame or a subsequent frame.

However, while device 300 is performing an autofocus operation, objects within the field of view may be blurred and as such, device 300 may not need to process all 3,072 pairs of BG stats in order to determine a white balance gain. Rather, while device 300 is focusing, device 300 may process a subset of data points in order to determine and apply the white balance gain to a current frame or subsequent frame. This may be particularly useful during preview mode because if device 300 does not perform automatic white balance at all while device 300 and/or camera 302 is autofocusing, the color of the rendered/displayed frame (e.g., image) of the field of view may not be accurate as compared to human eyes. Alternatively, as discussed above, performing AWB for each frame, particularly during preview mode, may consume a lot of power while device 300 is still determining the correct focus for the scene. As such, it may be beneficial to process less data for AWB purposes while the device and/or camera (e.g., device 300 and/or camera 302) focuses on the scene in order to prevent drastic color changes in the displayed preview images.

Figure 6:
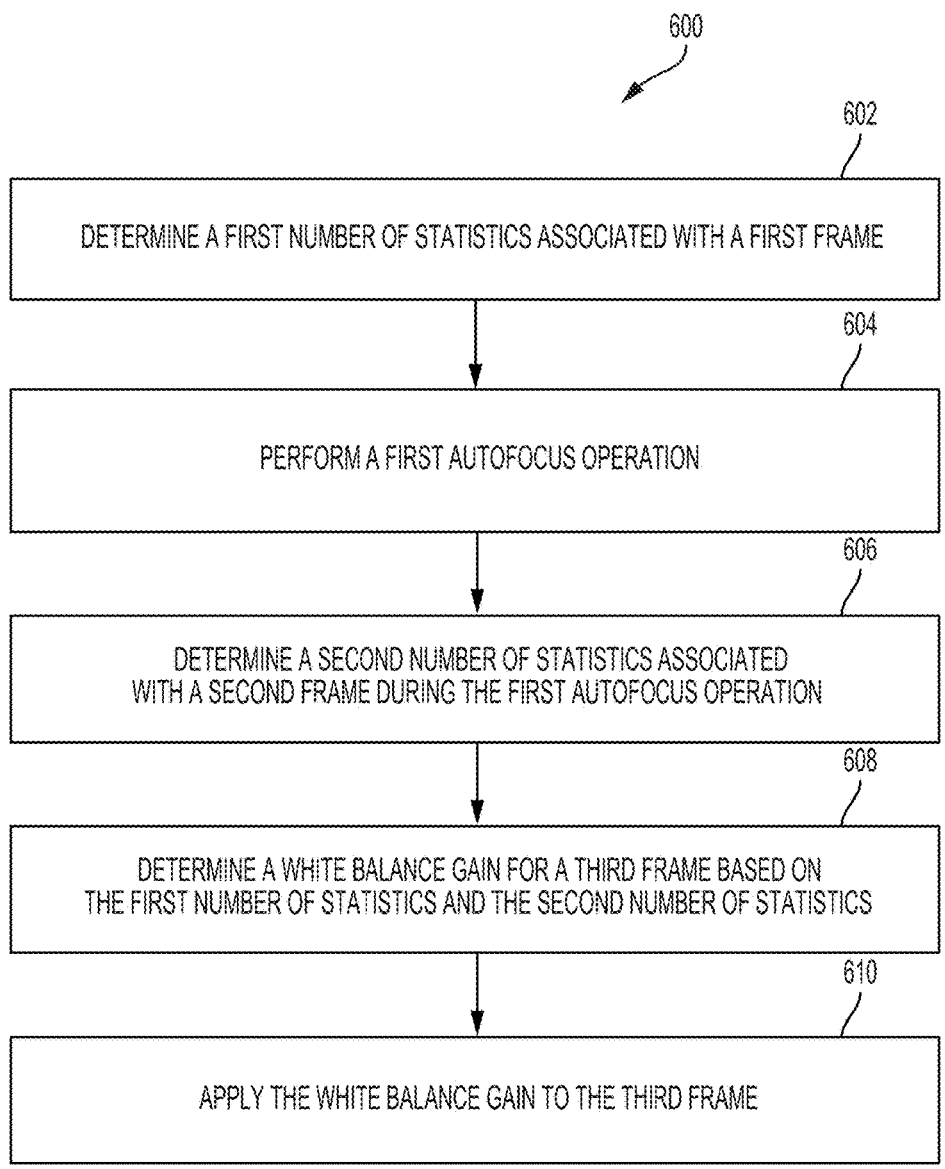
FIG. 6 is a flow chart illustrating an example operation for enabling automatic white balance in a low power mode.

FIG. 6 is an illustrative flow chart depicting an example of a method 600 for a less power consuming AWB. Method 600 may be stored as instructions 310 within memory 308 of FIG. 3. Method 600 may be executed by one or more processors (e.g., processor 306, camera controller 312, and/or image signal processor 314 as shown in FIG. 3, and/or other processors not shown in FIG. 3).

At block 602, method 600 may determine a first number of statistics associated with a first frame. A first frame may be received via camera 302 of FIG. 3 in or near real-time. The first frame may or may not be stored in permanent memory (e.g., memory 308 of FIG. 3 or external memory not shown in FIG. 3). The first frame may include a preview frame that may be displayed via a display associated with device 300 (e.g., a preview frame displayed via display 316 of FIG. 3). The first frame may include a frame (e.g., image) to be captured by device 300 (e.g., an image to be stored in memory 308 and/or a photo library for later access by a user). The first frame may include a field of view of device 300. The first frame may be the first frame of a plurality of frames (e.g., a plurality of frames being received at device 300 for preview or video capture). For example, the first frame may be the first frame received at device 300 after accessing and/or opening camera 302 and/or a camera application of device 300. Alternatively, the first frame may be any frame within a plurality of frames received at device 300 (e.g., for preview or video capture).

The first number of statistics associated with the first frame may be determined in a similar manner as described above with reference to FIG. 5A. The first frame may be divided into a first number of portions (e.g., 3,072 portions, or any other number of portions, but the more portions, the more processing power is required to process all of the data). The first number of statistics may include BG stats (e.g., R/G and B/G). The R/G and the B/G may be calculated for each portion of the first number of portions. For example, if the first frame is divided into 3,072 portions, then 3,072 pairs of BG stats (e.g., 3,072 R/G stats and 3,072 B/G stats) may be determined for the first frame.

A first white balance gain associated with the first number of statistics may be determined. For example, the first white balance gain may be determined based on the first number of statistics in a manner described above or using any white balance algorithm. The first white balance gain may be applied to the first frame or a subsequent frame (e.g., such as a second frame).

Device 300 may determine whether the first frame, or an object or point of interest within the first frame, is out of focus. The first frame may be out of focus for any number of reasons including, but not limited to, the first frame being the first frame being received at device 300 (e.g., such that device 300 and/or camera 302 has not yet had an opportunity to focus on a particular object point of interest within the field of view), the device moved, an object of interest within the field of view moved, a new scene or part of a new scene is within the field of view of camera 302, and/or any other reason.

Device 300 may determine whether the first frame is out of focus based on an autofocus status signal. An AF process or any other module and/or processor, may determine whether the first frame is stable or unstable. Stable may indicate that the first frame is in focus and unstable may indicate that the first frame is out of focus. The result of the determination may be sent to AWB process (e.g., AWB process 404 of FIG. 4 or other AWB process or module) via the form of a status signal (e.g., an AF status signal). The AF status signal may indicate whether the first frame is stable or unstable.

If the first frame is out of focus, the AF status signal may indicate whether an autofocus operation has started and a type of autofocus operation currently being performed. There are various autofocus operations, and this disclosure is not limited to any particular autofocus operation. Autofocus operations may include, but are not limited to, phase detection autofocus, contrast detection autofocus, Bayer autofocus, etc. Autofocus operations may include one or more stages of autofocusing. For example, an autofocus operation may include a course search (e.g., a course search autofocus operation) and/or a fine search (e.g., a fine search autofocus operation). A course search autofocus operation may include moving a lens of camera 302 in large course steps through different lens positions. At each lens position, a focus value is calculated. In this manner, a peak of a curve may be determined in which the focus value increases for each lens position, but may eventually decrease at a particular lens position. When the focus value decreases for a particular lens position such that the peak of the curve occurred at a prior lens position, the autofocus operation may transition to a fine search autofocus operation. One or more decreasing focus values may be determined in order to transition to the fine search autofocus. The fine search autofocus operation may include moving the lens of camera 302 in smaller steps than the course steps of the course search autofocus operation through different lens positions. The lens movements during the fine search autofocus operation may include forward and/or backward movements. The smaller steps/movements may indicate that the image (e.g., an object or region of interest within the field of view) is nearing focus.

At block 604, method 600 may perform a first autofocus operation. For example, one or more processors of device 300 may cause camera 302 to perform a first autofocus operation. As described above, it may be determined that the first frame is out of focus, resulting in a first autofocus operation. The first autofocus operation may include the course search autofocus operation. Causing camera 302 to perform the first autofocus operation may include providing instructions to camera 302 and/or components of camera 302 to move lens to various lens positions, as described above, in order to determine an optimal lens position to focus the object and/or region of interest within the scene.

At block 606, method 600 may determine a second number of statistics associated with a second frame during the first autofocus operation. A second frame may be received via camera 302 of FIG. 3 in or near real-time. The second frame may or may not be stored in memory (e.g., memory 308 of FIG. 3 or external memory not shown in FIG. 3). The second frame may include a preview frame that may be displayed via a display associated with device 300 (e.g., a preview frame displayed via display 316 of FIG. 3). The second frame may include a frame (e.g., image) to be captured by device 300 (e.g., an image to be stored in memory 308 and/or a photo library for later access by a user). The second frame may include a field of view of device 300. The field of view of device 300 for the second frame may be the same as the first frame, different than the first frame, and/or partially the same as the first frame. The second frame may be received after the first frame. The second frame may be the frame immediately following the first frame (e.g., if the first frame is frame N−1, then the second frame is frame N), or the second frame may be any frame received after the first frame (e.g., if the first frame is frame N−1, then the second frame may be N+1, N+2, or any other frame of a plurality of frames being received at device 300 for preview or video capture). The second frame may be received as camera 302 is performing the first autofocus operation.

The second number of statistics associated with the second frame may be determined in a number of ways including, but not limited to, dividing the second frame into larger portions than the first frame thus dividing the second frame into fewer portions than the first frame, obtaining statistics for every other portion of the second frame, obtaining statistics for every third, fourth, or so on portion of the second frame, averaging one or more portions of the second frame, and so on. The number of statistics that may be determined for the second number of statistics may be determined automatically or may be received by a manual entry by a user. For example, the user of device 300 may provide that if the first number of statistics is 3,072, then the second number of statistics should be a particular percentage of the first number of statistics (e.g., 20%, 25%, 50%, etc.). Alternatively, the user of device 300 may provide that the second number of statistics should always be a particular number of statistics (e.g., 256, 700, etc.).

Figure 7B:
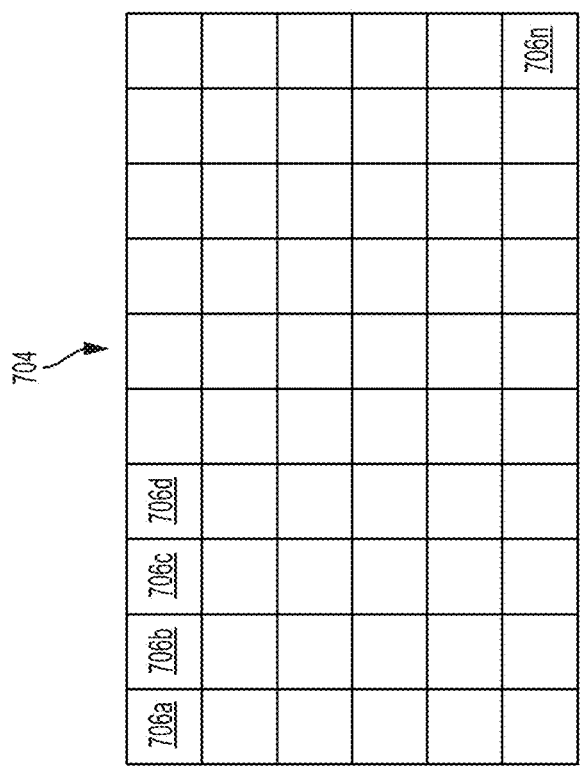
FIGS. 7A and 7B depicts frames divided into a plurality of portions.
Figure 7A:
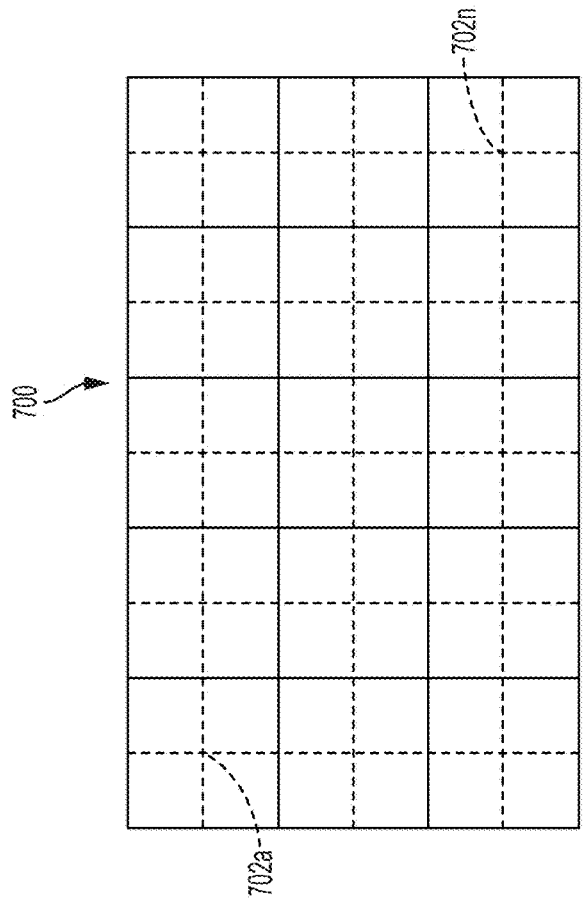

For example and referring to FIG. 7A, the second frame (e.g., second frame 700) may be divided into a second number of portions (e.g., 256 portions, or any other number of portions). The portions of the second frame may be larger than the portions of the first frame, such that the second number of portions may be less than the first number of portions. In other words, the second number of portions of the second frame may be less than first number of portions of the first frame. The second number of statistics may include BG stats (e.g., R/G and B/G). The R/G and the B/G may be calculated for each portion of the second number of portions in a similar manner as calculating R/G and B/G as discussed above with reference to Equations (1) and (2) respectively. For example, if the second frame is divided into 256 portions, then 256 pairs of BG stats (e.g., 256 R/G stats and 256 B/G stats) may be determined for the second frame. As shown in the example of FIG. 7A, each portion 702a-702n of second frame 700 may include a region of 2×2 portions of the portions of FIG. 5A, as shown by the dotted lines. This is not meant to be a limitation of this disclosure, as second frame 700 may be divided into any number of portions in any number of ways. For example, portions 702a-702n may include a region of 1×3 portions of the portions of FIG. 5A, 2×3 portions of the portions of FIG. 5A, and/or any other configuration. In addition, portions 702a-702n may not be equal in size. For example, portion 702a may include a region of 2×3 portions of the portions of FIG. 5A while portion 702n may include a region of 4×4 portions of the portions of FIG. 5A. Referring to portions 702a-702n including a region of portions with reference to FIG. 5A is for exemplary purposes only and is not meant to be a limitation of this disclosure.

In another example, the second number of statistics may be determined by obtaining statistics for every other portion of the second frame or obtaining statistics for every third, fourth, or so on portion of the second frame. Referring to FIG. 7B, second frame 704 may be divided into a second number of portions (e.g., portions 706a-706n). The second number of portions may be the same, less, or more than the first number of portions of the first frame. However, BG stats associated with fewer than all of the second number of portions may be determined. For example, BG stats of every other portion of the second number of portions may be determined or BG stats of every third, fourth, tenth, etc.

portion of the second number of portions may be determined. Rather than determining BG stats for each portion, as described with reference to FIGS. 5A and 7A (with FIG. 7A including fewer portions than FIG. 5A), BG stats may be determined for portions 706a, 706c, 706e, and so on. Alternatively, BG stats may be determined for portions 706a, 706d, and so on.

Referring back to FIG. 6, at block 608, method 600 may determine a white balance gain based on the first number of statistics and the second number of statistics. Determining the white balance gain based on the first number of statistics and the second number of statistics may include determining a second white balance gain associated with the second number of statistics. The second white balance gain may be determined, based on the second number of statistics, using the same white balance algorithm as used to determine the first white balance gain or using a different white balance algorithm.

Determining the white balance gain may include interpolating the first white balance gain and the second white balance gain. While any form of interpolation may be used, linear interpolation may be used for its speed and simplicity. Interpolating the first white balance gain and the second white balance gain may include using any interpolation algorithm. For example, some interpolation algorithms may include, but are not limited to, linear interpolation, polynomial interpolation, spline interpolation, and so on. A simple example of linear interpolation may include averaging the first white balance gain and the second white balance gain. For example, and referring to equation (3) below, AWB' may represent the interpolated white balance gain based on a weight ($\alpha$) applied to $(AWB)_t$, where $(AWB)_t$ represents the white balance gain determined for a previous frame. In this example, $(AWB)_t$ may be the first white balance gain that was determined associated with the first number of statistics associated with the first frame. The weight ($\alpha$) may be a value ranging from 0-1. The weight may vary for different frames. Further, (current AWB) may represent the white balance gain of a current frame. In this example, the current frame is the second frame, so (current AWB) represents the second white balance gain.

$$AWB'=\alpha(AWB)_t+(1-\alpha)(current\ AWB) \qquad (3)$$

Referring back to FIG. 6, at block 610, method 600 may apply the white balance gain (e.g., AWB' from above) to a subsequent frame (e.g., a third frame). The third frame may be received at device 300 of FIG. 3. The third frame may be the immediate frame after the second frame or may be a subsequent frame at a later time. The third frame with the applied white balance gain may be output for display via a display associated with device 300 (e.g., display 316 of FIG. 3).

Device 300 (camera controller 312 and/or ISP 314) may receive a third frame. The third frame may include a preview frame that may be displayed via a display associated with device 300 (e.g., a preview frame displayed via display 316 of FIG. 3). The third frame may include a frame (e.g., image) to be captured by device 300 (e.g., an image to be stored in memory 308 and/or a photo library for later access by a user). The third frame may include a field of view of device 300. The field of view of device 300 for the third frame may be the same as the second frame, different than the second frame, and/or partially the same as the second frame. The third frame may be received after the second frame. The third frame may be the frame immediately following the second frame (e.g., if the first frame is frame N−1, then the second frame is frame N, and the third frame is frame N+1), or the third frame may be any frame received after the second frame (e.g., if the second frame is frame N, then the third frame may be N+1, N+2, or any other frame of a plurality of frames being received at device 300 for preview or video capture after the second frame). In some examples, the third frame may be received as camera 302 is performing the first autofocus operation.

Device 300 may determine whether camera 302 is still searching for an optimal lens position based on the status signal (e.g., the AF status signal). For example, the AF status signal may be sent from an AF process to AWB process 404 for every frame or periodically (e.g., every other frame, etc.). The AF status signal may indicate whether the frame is stable or unstable.

For purposes of this example, AWB process 404 may determine that camera 302 may still be searching for the optimal lens position based on the received AF status signal indicating that the frame is unstable and that camera 302 is still performing the first autofocus operation (e.g., a course search autofocus operation). As such, device 300 (e.g., via AWB process 404) may determine a third number of statistics associated with the third frame during the first autofocus operation. The third number of statistics may be less than the first number of statistics. The third number of statistics may be the same number of statistics as the second number of statistics or may include more or less statistics than the second number of statistics. The third number of statistics may be determined in any way as described above with reference to the second number of statistics, however the third number of statistics may be determined in the same way or a different way than the second number of statistics. For example, if the second number of statistics were determined by dividing or partitioning the second frame into fewer portions than the first frame, then the third number of statistics may be determined in the same manner as the second frame or may be determined in another way described above (e.g., skipping portions of the third frame, averaging one or more portions of the third frame, etc.).

A third white balance gain may be determined based on the third number of statistics and one or more of the first number of statistics and/or the second number of statistics. The third white balance gain, in this example, may be determined in a similar manner as described above, such that a white balance gain associated with the third number of statistics may be determined. That white balance gain associated with the third number of statistics may then be interpolated with either the first white balance gain, the second white balance gain, and/or the interpolated white balance gain that was applied to third frame. The third white balance gain (e.g., interpolated based on a determined white balance gain associated with the third number of statistics and a subsequent white balance gain). The third white balance gain may be applied to a subsequent frame (e.g., a fourth frame). The frame with the applied third white balance gain may be optionally displayed.

For purposes of the next example, AWB process 404 may determine that camera 302 may still be searching for the optimal lens position based on the received AF status signal indicating that the frame is unstable. However, the AF status signal may indicate that while the frame is unstable, camera 302 is performing and/or beginning a second autofocus operation. The second autofocus operation may include a fine search autofocus operation. As discussed above, the fine search autofocus operation may indicate that camera 302 is closer to determining the optimal lens position than camera 302 was for a previous frame and that the lens movements (e.g., steps) may be smaller during the fine search autofocus operation than during the course search autofocus operation. As such, device 300 (e.g., via AWB process 404) may determine a third number of statistics associated with the third frame during the second autofocus operation. The third number of statistics may be the same as the first number of statistics or may be less than or more than the first number of statistics. The third number of statistics may be determined in any way as described above with reference to the first number of statistics or the second number of statistics.

A third white balance gain in this example may be determined based on the third number of statistics. That is, while camera 302 is closer to determining the optimal lens position such that the object and/or area of interest of the field of view of camera 302 is nearing focus, AWB process 404 may simply use the third number of statistics in order to determine the third white balance gain. In this manner, a previously determined white balance gain associated with a previous frame may not be used in order to determine the third white balance gain in this example. As such, the third white balance gain may be determined in a similar manner as described with reference to FIGS. 5A and 5B. Once the third white balance gain is determined, the third white balance gain for may be applied to the third frame or a subsequent frame (e.g., a fourth frame). The frame with the applied third white balance gain may be optionally displayed.

Figure 8:
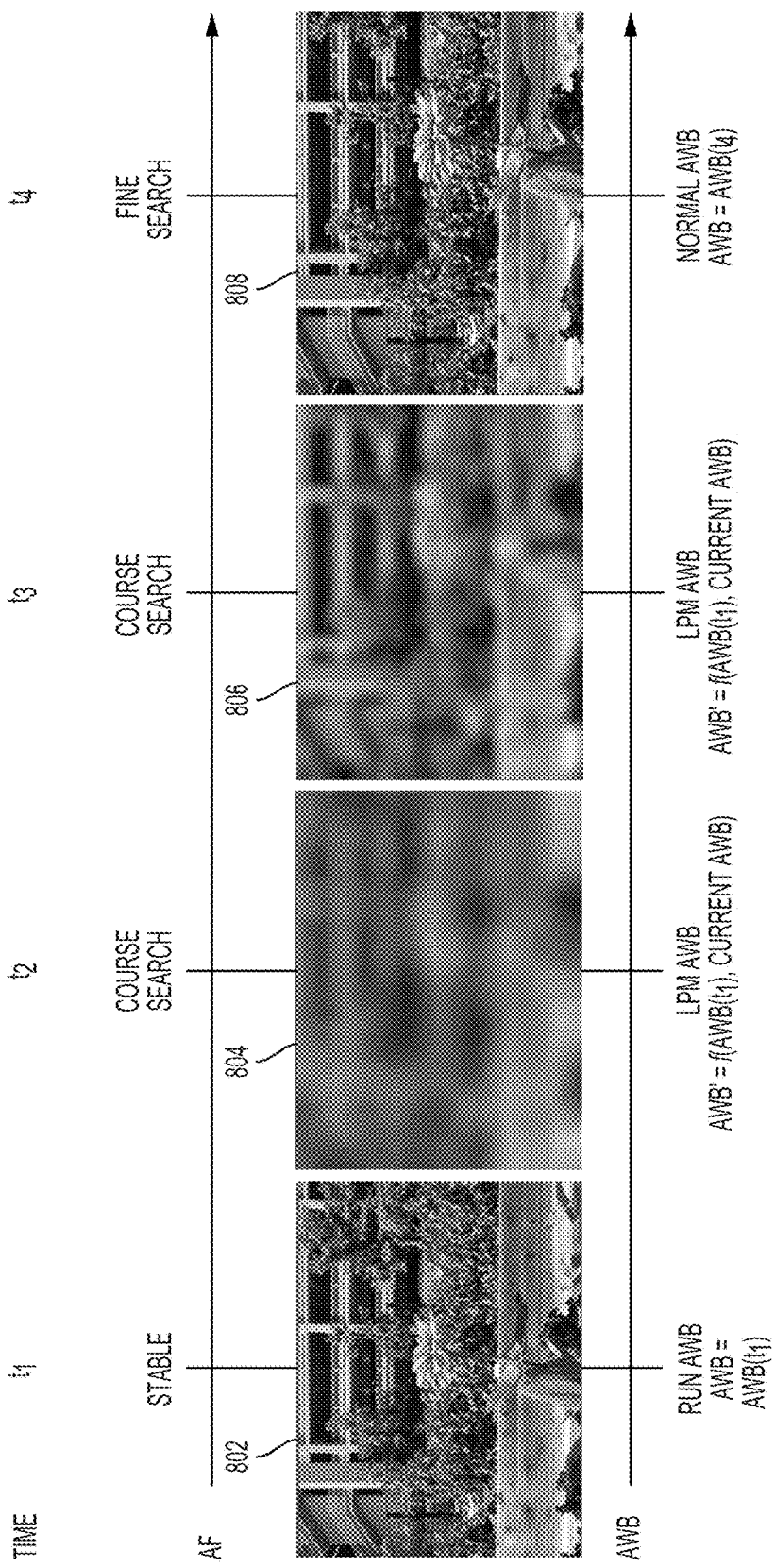
FIG. 8 depicts a plurality of frames captured over time.

FIG. 8 refers to an overall example of the disclosure. For example, FIG. 8 depicts four (4) frames captured at times $t_1$, $t_2$, $t_3$, and $t_4$. For example, frame 802 may have been captured at time $t_1$, frame 804 may have been captured at time $t_2$, frame 806 may have been captured at time $t_3$, and frame 808 may have been captured at time $t_4$. More or less frames may be captured at various times, as FIG. 8 is meant for illustrative purposes only and is not meant to be a limitation of this disclosure.

As shown at time $t_1$, an AF status signal may be received indicating that frame 802 is stable. As such, normal AWB may be run such that a first number of statistics may be determined associated with frame 802. The white balance gain (e.g., the first white balance gain) may be determined by using all of the first number of statistics, as described above, and as indicated by AWB=AWB($t_1$).

At time $t_2$, something may have caused frame 804 to be out of focus (e.g., blurred), as the AF status signal indicates that a course search autofocus operation has begun. An object in the field of view may have moved or the device may have moved. As such, AWB may run in a low power mode such that a second number of statistics may be determined associated with frame 804. The second number of statistics associated with frame 804 may be less than the first number of statistics associated with frame 802. The white balance gain (AWB') may be determined by interpolating the first white balance gain (AWB($t_1$)) with a second white balance gain (e.g., the current AWB gain). The interpolation in FIG. 8 with regards to frame 804 may be represented as AWB'=f(AWB($t_1$), current AWB).

At time $t_3$, frame 806 still appears to be out of focus, though it appears that the device is actively working on focusing (e.g., determining a lens position for optimal focus) because frame 806 is less blurred than frame 804. At time $t_3$, the AF status signal indicates that a course search autofocus operation is still in progress. As such, AWB may continue running in a low power mode such that a third number of statistics may be determined associated with frame 806. The third number of statistics associated with frame 806 may be less than the first number of statistics associated with frame 802, but may be the same number, more than, or less than the second number of statistics associated with frame 804. The white balance gain (AWB') determined by interpolating a previously determined white balance gain (e.g., AWB', AWB ($t_1$), or the second white balance gain (current AWB at $t_2$) with a current AWB gain (e.g., current AWB). The interpolation in FIG. 8 with regards to frame 806 may be represented as AWB'=f(AWB($t_1$), current AWB), such that in this example, the current AWB gain at $t_3$ is interpolated with the first white balance gain (AWB($t_1$)).

At time $t_4$, frame 808 appears to be in focus or close to focus, as the AF status signal indicates that a fine search autofocus operation has begun. As such, the low power mode AWB process may return to a normal AWB process, such that a fourth number of statistics may be determined associated with frame 808. The fourth number of statistics associated with frame 808 may be the same number of statistics as the first number of statistics associated with frame 802, more than the first number of statistics associated with frame 802, or less than the first number of statistics associated with frame 802. The fourth white balance gain may be determined by using all of the fourth number of statistics, as indicated by AWB=AWB($t_4$).

Certain aspects of this disclosure have been provided above. Some of these aspects may be applied independently and some of them may be applied in combination as would be apparent to those of skill in the art. In the foregoing description, for the purposes of explanation, specific details are set forth in order to provide a thorough understanding of embodiments of the invention. However, it will be apparent that various aspects may be practiced without these specific details. The figures and description are not intended to be restrictive. Rather, the ensuing description of the exemplary aspects will provide those skilled in the art with an enabling description for implementing an exemplary aspect. It should be understood that various changes may be made in the function and arrangement of elements without departing from the spirit and scope of the invention as set forth in the appended claims.

Specific details are given in the description to provide a thorough understanding of the different aspects of the disclosure. However, it will be understood by one of ordinary skill in the art that the examples described may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Moreover, the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Further, the various illustrative logical blocks, modules, circuits, and algorithm steps described in connection with the embodiments disclosed herein may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

While the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples, and any means for performing the functionality described herein are included in aspects of the disclosure.

What is claimed is:

1. A device, comprising:
   a memory; and
   a processor coupled to a camera and the memory, the processor configured to:
   determine a first number of statistics associated with a first frame;
   cause the camera to perform a first autofocus operation;
   determine a second number of statistics associated with a second frame during the first autofocus operation, the second number of statistics being less than the first number of statistics;
   determine a white balance gain based on the first number of statistics and the second number of statistics; and
   apply the white balance gain to a third frame.

2. The device of claim 1, wherein the processor is further configured to:
   determine a first white balance gain associated with the first number of statistics; and
   determine a second white balance gain associated with the second number of statistics.

3. The device of claim 2, wherein the processor is further configured to:
   apply the first white balance gain to the second frame.

4. The device of claim 2, wherein determining the white balance gain includes interpolating the first white balance gain associated with the first number of statistics and the second white balance gain associated with the second number of statistics.

5. The device of claim 1, wherein the processor is further configured to:
   output the third frame with the applied white balance gain for display.

6. The device of claim 1, wherein the first autofocus operation includes a course search autofocus operation.

7. The device of claim 1, further comprising:
   the camera.

8. The device of claim 7, further comprising:
   a display.

9. The device of claim 1, wherein the processor is further configured to:

receive the third frame;
determine a third number of statistics associated with the third frame during the first autofocus operation, the third number of statistics being less than the first number of statistics;
determine a third white balance gain based on the third number of statistics and one or more of the first number of statistics and the second number of statistics; and
apply the third white balance gain to a fourth frame.

10. The device of claim 1, wherein the processor is further configured to:
receive the third frame;
cause the camera to perform a second autofocus operation;
determine a third number of statistics associated with the third frame during the second autofocus operation;
determine a third white balance gain based on the third number of statistics; and
apply the third white balance gain to a fourth frame.

11. The device of claim 10, wherein the first autofocus operation includes a course search autofocus operation and the second autofocus operation includes a fine search autofocus operation.

12. A method, comprising:
determining a first number of statistics associated with a first frame;
performing a first autofocus operation;
determining a second number of statistics associated with a second frame during the first autofocus operation, the second number of statistics being less than the first number of statistics;
determining a white balance gain based on the first number of statistics and the second number of statistics; and
applying the white balance gain to a third frame.

13. The method of claim 12, further comprising:
determining a first white balance gain associated with the first number of statistics; and
determining a second white balance gain associated with the second number of statistics.

14. The method of claim 13, further comprising:
applying the first white balance gain to the second frame.

15. The method of claim 13, wherein determining the white balance gain includes interpolating the first white balance gain associated with the first number of statistics and the second white balance gain associated with the second number of statistics.

16. The method of claim 12, further comprising:
outputting the third frame with the applied white balance gain for display.

17. The method of claim 16, wherein the third frame is output for display via a display.

18. The method of claim 12, wherein the first autofocus operation includes a course search autofocus operation.

19. The method of claim 12, further comprising:
receiving the third frame;
determining a third number of statistics associated with the third frame during the first autofocus operation, the third number of statistics being less than the first number of statistics;
determining a third white balance gain based on the third number of statistics and one or more of the first number of statistics and the second number of statistics; and
applying the third white balance gain to a fourth frame.

20. The method of claim 12, further comprising:
receiving the third frame;
performing a second autofocus operation;
determining a third number of statistics associated with the third frame during the second autofocus operation;
determining a third white balance gain based on the third number of statistics; and
applying the third white balance gain to a fourth frame.

21. The method of claim 20, wherein the first autofocus operation includes a course search autofocus operation and the second autofocus operation includes a fine search autofocus operation.

22. A non-transitory computer-readable storage medium storing instructions thereon that when executed cause one or more processors to:
determine a first number of statistics associated with a first frame;
perform a first autofocus operation;
determine a second number of statistics associated with a second frame during the first autofocus operation, the second number of statistics being less than the first number of statistics;
determine a white balance gain based on the first number of statistics and the second number of statistics; and
apply the white balance gain to a third frame.

23. The non-transitory computer-readable storage medium of claim 22, wherein execution of the instructions further causes the one or more processors to:
determine a first white balance gain associated with the first number of statistics; and
determine a second white balance gain associated with the second number of statistics.

24. The non-transitory computer-readable storage medium of claim 23, wherein execution of the instructions further causes the one or more processors to:
apply the first white balance gain to the second frame.

25. The non-transitory computer-readable storage medium of claim 23, wherein determining the white balance gain includes interpolating the first white balance gain associated with the first number of statistics and the second white balance gain associated with the second number of statistics.

26. The non-transitory computer-readable storage medium of claim 22, wherein execution of the instructions further causes the one or more processors to:
output the third frame with the applied white balance gain for display.

27. The non-transitory computer-readable storage medium of claim 22, wherein the first autofocus operation includes a course search autofocus operation.

28. The non-transitory computer-readable storage medium of claim 22, wherein execution of the instructions further causes the one or more processors to:
receive the third frame;
determine a third number of statistics associated with the third frame during the first autofocus operation, the third number of statistics being less than the first number of statistics;
determine a third white balance gain based on the third number of statistics and one or more of the first number of statistics and the second number of statistics; and
apply the third white balance gain to a fourth frame.

29. The non-transitory computer-readable storage medium of claim 22, wherein execution of the instructions further causes the one or more processors to:
receive the third frame;
perform a second autofocus operation;
determine a third number of statistics associated with the third frame during the second autofocus operation;

determine a third white balance gain based on the third number of statistics; and apply the third white balance gain to a fourth frame.

30. The non-transitory computer-readable storage medium of claim 29, wherein the first autofocus operation includes a course search autofocus operation and the second autofocus operation includes a fine search autofocus operation.

\* \* \* \* \*